(12) United States Patent
Briese

(10) Patent No.: US 9,217,655 B2
(45) Date of Patent: Dec. 22, 2015

(54) SENSOR SYSTEM FOR DETERMINING AT LEAST ONE FLOW PROPERTY OF A FLUID MEDIUM FLOWING IN A MAIN FLOW DIRECTION

(75) Inventor: Achim Briese, Rutesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 137 days.

(21) Appl. No.: 13/526,422

(22) Filed: Jun. 18, 2012

(65) Prior Publication Data

US 2012/0324990 A1    Dec. 27, 2012

(30) Foreign Application Priority Data

Jun. 22, 2011  (DE) .......................... 10 2011 078 004

(51) Int. Cl.
  *G01M 15/04*  (2006.01)
  *G01F 1/684*  (2006.01)
  *G01F 1/692*  (2006.01)
  *G01F 5/00*  (2006.01)
  *F15D 1/02*  (2006.01)

(52) U.S. Cl.
  CPC .............. *G01F 1/6842* (2013.01); *G01F 1/684* (2013.01); *G01F 1/6845* (2013.01); *G01F 1/692* (2013.01); *G01F 5/00* (2013.01); *F15D 1/02* (2013.01)

(58) Field of Classification Search
  CPC ... G01M 15/042; G01M 15/14; G01M 15/00; G01M 15/046; G01M 15/04; G01F 5/00
  USPC ............... 73/114.31, 114.32, 114.33, 114.35, 73/114.37
  See application file for complete search history.

(56) References Cited

U.S. PATENT DOCUMENTS

| 4,297,894 | A | * | 11/1981 | Nagaishi et al. | ............ 73/861.03 |
| 4,375,204 | A | * | 3/1983 | Yamamoto | .................... 123/494 |
| 4,457,166 | A | * | 7/1984 | Kobayashi | ................ 73/114.35 |
| 4,459,847 | A | * | 7/1984 | Kita | ........................... 73/114.35 |
| 4,630,484 | A | * | 12/1986 | Mizuno et al. | ............. 73/861.22 |
| 4,819,490 | A | * | 4/1989 | Isobe et al. | ................. 73/861.22 |
| 4,869,099 | A | * | 9/1989 | Takahashi et al. | ......... 73/114.33 |
| 5,029,465 | A | * | 7/1991 | Tanimura et al. | .......... 73/114.35 |
| 5,398,548 | A | * | 3/1995 | Ono | ............................... 73/202 |
| 5,728,946 | A | * | 3/1998 | Sasaki et al. | ............... 73/861.22 |
| 5,908,991 | A | * | 6/1999 | Sasaki et al. | ............... 73/861.22 |

(Continued)

FOREIGN PATENT DOCUMENTS

DE   10 2008 042 155   3/2010

OTHER PUBLICATIONS

Konrad Reif: Sensoren im Kraftfahrzeug (Sensors in Motor Vehicles), Edition 1, 2010, pp. 146-148.

*Primary Examiner* — Eric S McCall
(74) *Attorney, Agent, or Firm* — Kenyon & Kenyon LLP

(57) ABSTRACT

A sensor system for determining a parameter of a fluid medium, e.g., an intake air mass flowing through a channel, includes at least one sensor chip situated in the channel for determining the parameter, which sensor chip is accommodated in a sensor carrier which (i) protrudes into the channel and (ii) has a leading edge situated transverse to the flow of the fluid medium. At least one vortex generator is provided, at least in the region of the leading edge, and configured for forming secondary flows in the flowing fluid medium in the region of the sensor carrier, for avoiding or reducing the entry of particles. The secondary flows extend in a plane essentially perpendicular to the main flow direction of the fluid medium, e.g., facing away from the sensor area.

12 Claims, 14 Drawing Sheets

(56) References Cited

U.S. PATENT DOCUMENTS

| | | | |
|---|---|---|---|
| 7,162,920 B2 * | 1/2007 | Konzelmann et al. | 73/202.5 |
| 7,216,535 B2 * | 5/2007 | Kikawa et al. | 73/202.5 |
| 7,305,877 B2 * | 12/2007 | Beyrich et al. | 73/202.5 |
| 7,360,414 B2 * | 4/2008 | Konzelmann et al. | 73/202.5 |
| 7,980,125 B2 * | 7/2011 | Renninger et al. | 73/204.11 |
| 8,607,624 B2 * | 12/2013 | Renninger et al. | 73/114.32 |
| 2006/0021429 A1 * | 2/2006 | Konzelmann et al. | 73/202.5 |
| 2007/0062275 A1 * | 3/2007 | Beyrich et al. | 73/204.21 |
| 2010/0300187 A1 * | 12/2010 | Renninger et al. | 73/114.42 |
| 2011/0179858 A1 * | 7/2011 | Mais et al. | 73/114.32 |
| 2012/0048005 A1 * | 3/2012 | Renninger et al. | 73/114.32 |

* cited by examiner

SENSOR SYSTEM FOR DETERMINING AT LEAST ONE FLOW PROPERTY OF A FLUID MEDIUM FLOWING IN A MAIN FLOW DIRECTION

BACKGROUND OF THE INVENTION

1. Field of the Invention

The present invention relates to a sensor system for determining at least one flow property of fluid medium.

2. Description of the Related Art

Numerous methods and devices are known from the related art for determining at least one flow property of fluid media, i.e., liquids and/or gases. The flow properties may be basically any given physically and/or chemically measurable properties which qualify or quantify a flow of the fluid medium. In particular, a flow rate and/or a mass flow and/or a volume flow may be involved.

The present invention is described below in particular with reference to so-called hot film air mass meters, as described, for example, in Konrad Reif (publisher): *Sensoren im Kraftfahrzeug [Sensors in Motor Vehicles]*, Edition 1, 2010, pages 146-148. These types of hot film air mass meters are generally based on a sensor chip, in particular a silicon sensor chip, having a sensor diaphragm as a measuring surface or sensor area over which the flowing fluid medium is able to flow. The sensor chip generally includes at least one heating element and at least two temperature sensors which are situated, for example, on the measuring surface of the sensor chip. A mass flow and/or volume flow of the fluid medium may be deduced based on an asymmetry of the temperature profile detected by the temperature sensors, which is influenced by the flow of the fluid medium. Hot film air mass meters are usually designed as plug-in sensors which are permanently or replaceably introducible into a flow tube. For example, this flow tube may be an intake tract of an internal combustion engine.

A partial flow of the medium flows through at least one main channel provided in the hot film air mass meter. A bypass channel is provided between the inlet and the outlet of the main channel. In particular, the bypass channel is designed in such a way that it has a curved section for deflecting the partial flow of the medium which has entered through the inlet of the main channel, the further course of the curved section merging into a section in which the sensor chip is situated. The latter-mentioned section represents the actual measuring channel in which the sensor chip is situated. A means is provided in the bypass channel which conducts the flow and counteracts separation of the flow of the media partial flow from the channel walls of the measuring channel. Furthermore, in the region of its opening, which points against the main flow direction, the inlet area of the main channel is provided with angled or curved surfaces which are designed in such a way that medium flowing into the inlet area is diverted from the portion of the main channel leading to the sensor chip. As a result, liquid or solid particles contained in the medium may not reach the sensor chip due to their mass inertia, and may soil the sensor chip.

In practice, these types of hot film air mass meters must meet numerous requirements and constraints. In addition to the aim of reducing an overall pressure drop at the hot film air mass meter with the aid of suitable flow designs, one of the main challenges is to further improve the signal quality as well as the robustness of such devices with respect to contamination by oil and water droplets, as well as soot, dust, and other solid particles. This signal quality relates, for example, to a mass flow of the medium through the measuring channel leading to the sensor chip, and optionally to the reduction of a signal drift and the improvement of the signal-to-noise ratio. The signal drift relates to the deviation, for example of the mass flow of the medium, in the sense of changing the characteristic curve relationship between the mass flow actually occurring and the signal to be emitted within the scope of calibration during manufacture. For ascertaining the signal-to-noise ratio, the sensor signals which are output in a rapid time sequence are taken into account, whereas the characteristic curve drift or signal drift refers to a change in the mean value.

In customary hot film air mass meters of the described type, a sensor carrier having a sensor chip mounted thereon or inserted therein generally protrudes into the measuring channel. For example, the sensor chip may be glued into or onto the sensor carrier. The sensor carrier may form a unit with, for example, a base plate made of metal on which an electronics system and a control and evaluation circuit in the form of a printed circuit board may be glued. For example, the sensor carrier may be designed as a molded-on plastic part of an electronic module. The sensor chip and the control and evaluation circuit may be connected to one another via bond connections, for example. The electronic module produced in this way may, for example, be glued into a sensor housing, and the entire plug-in sensor may be closed by covers.

So that the hot film air mass meter is able to deliver an air mass signal which is as free of interference as possible, flow to the plug-in sensor and through the measuring channel in the plug-in sensor, and in particular over the measuring surface of the sensor chip, which is as uniform as possible, is important. It has been shown that the contour of the leading edge of the sensor carrier which protrudes into the measuring channel is of crucial importance for the signal quality of the sensor system. Thus, for example, it is proposed in published German patent application document DE 103 455 084 A1 that the leading edge of the sensor carrier to have a rounded design to improve the flow quality at the sensor carrier and at the sensor chip, and to avoid pulsing, nonstationary separations at the surface of the sensor chip.

Published German patent application document DE 10 2008 042 155 A1 discloses a sensor system for determining at least one parameter of a fluid medium, in particular an intake air mass of an internal combustion engine, flowing through a channel. The sensor system has at least one sensor chip situated in the channel for determining the parameter of the fluid medium. The sensor chip is accommodated in a sensor carrier which protrudes into the channel. The sensor carrier has a leading edge, situated transverse to the flow of the fluid medium, which has at least one vortex generator that is set up to form longitudinal vortices in the flowing fluid medium in the region of the sensor carrier. These longitudinal vortices require an improved intermixture between rapid fluid more remote from the wall and slower fluid, close to the wall and in danger of separation, in the region of the sensor carrier. This intermixture boosts an avoidance of separations. These required longitudinal vortices are generated by the vortex generator at the leading edge of the sensor carrier. This reduces the fluctuation in flow in the region of the sensor carrier, resulting in reduced signal noise and better reproducibility of the signal.

Despite the numerous advantages of the methods known from the related art for reducing the signal noise, these methods are still capable of improvement with regard to other functional aspects. Thus, due to the above-described deflection, only lighter particles such as dust, soot, or water and/or oil droplets, for example, pass into the bypass channel and into the measuring channel. Due to their mass inertia, heavier particles exit the hot film air mass meter through the main channel or bounce against the surrounding walls. The contamination of the sensor chip and its sensor area by the mentioned lighter particles, in particular oil and dust, results in an undesirable characteristic curve drift. Since the heat transfer in the region of the sensor area is determined primarily by the boundary layer flow on the sensor chip side of the sensor carrier, and also to a certain degree by the layer remote from the wall, in the sense of the fluid mechanics definition of a boundary layer, the flow over these flow regions must be as stable as possible from a topological standpoint. The contamination by particles may result in an altered topology over the long term, i.e., a change in the flow-defining structure at certain points, for example specks of dust, vortex foci, separation lines, and the like, or may result in a quantitative change in the flow variables.

BRIEF SUMMARY OF THE INVENTION

A sensor system for determining at least one flow property of a fluid medium flowing in a main flow direction is therefore proposed, via which the disadvantages of known methods and strategies may be at least largely avoided, and in which a velocity field, in particular on the sensor chip side of the sensor carrier, which has long-term stability, in particular with regard to the particle contamination, may be generated.

The sensor system for determining at least one parameter of a fluid medium, in particular an intake air mass of an internal combustion engine, flowing through a channel has at least one sensor chip situated in the channel for determining the parameter of the fluid medium, the sensor chip being accommodated in a sensor carrier which protrudes into the channel, and the sensor carrier having a leading edge situated transverse to the main flow direction of the fluid medium, at least one vortex generator being provided at least in the region of the leading edge and being set up for forming secondary flows, in particular in the form of vortices, in the flowing fluid medium in the region of the sensor carrier, in particular in the region of the sensor chip, preferably in the immediate proximity of a sensor area, in particular of a micromechanical sensor diaphragm, the secondary flows extending in a plane essentially perpendicular to the main flow direction of the fluid medium. When the secondary flow is designed as a vortex, the vortex axis extends parallel to the main flow direction.

The sensor carrier may essentially define a plane in the main flow direction, and the at least one vortex generator may be designed in the form of at least one projection, such as a web or a ramp, for example, which protrudes from the plane of the sensor carrier. The at least one vortex generator may be provided, at least in places, along the leading edge and/or along a rear edge of the sensor carrier as viewed in the main flow direction of the fluid medium. The at least one turbulator may be situated transverse to the main flow direction. The at least one vortex generator may extend, at least in places, from the leading edge to a rear edge of the sensor carrier as viewed in the main flow direction of the fluid medium. The at least one vortex generator may be essentially semicircular or rectangular. Other cross-sectional shapes are also conceivable. The sensor chip may have at least one sensor area, and at least two vortex generators may be situated in such a way that at least the sensor area projects into a plane perpendicular to the flow of the fluid medium, situated between the vortex generators. The at least two vortex generators may be designed in such a way that due to multiple vortices, the secondary flows, at least in the region of the sensor area, are provided with the particular vortex axis parallel to the main flow direction of the fluid medium and in the mutually opposite rotational direction, i.e., with oppositely directed vortex axes. Multiple vortex generators may be situated extending in the main flow direction and parallel to one another. At least one vortex generator may be designed as an indentation in the sensor carrier, preferably at the front edge of the sensor carrier which extends in the main flow direction. At least one indentation in the sensor carrier may extend in the main flow direction and, projected into the plane perpendicularly to the main flow direction, may be located laterally adjacent to the sensor area.

Within the scope of the present invention, the main flow direction is understood to mean the local flow direction of the fluid medium at the location of the sensor or of the sensor system, whereby, for example, local irregularities such as turbulences may continue to be disregarded. In particular, the main flow direction may thus be understood to mean the local averaged transport direction of the flowing fluid medium.

Within the scope of the present invention, "transverse to the main flow direction" is understood to mean perpendicular or essentially perpendicular, for example having an orientation which deviates by no more than 10° from the vertical with respect to the local main flow direction. Within the scope of the present invention, "essentially" is understood to mean an orientation which deviates by no more than 20°, preferably by no more than 10°, and particularly preferably by no more than 5°, and/or by no more than 20%, in particular by no more than 10%, and particularly preferably by no more than 5%, of the particular stated reference direction, reference plane, or reference shape. Thus, for example, an "essentially parallel" orientation is an orientation which deviates from parallelism by no more than the stated tolerances.

Within the scope of the present invention, according to the fluid mechanics, secondary flow is understood to mean a comparatively low velocity, i.e., the secondary velocity, in addition to the main flow in a plane essentially transverse to the main flow direction.

Within the scope of the present invention, according to the fluid mechanics, a vortex is understood to mean a complete or partially circular flow or approximately circular flow of a fluid. Within the scope of the present invention, the vortex axis is understood to mean the axis about which the circular flow runs. This axis may extend, for example, parallel to a vortex vector of the vortices. To generate the vortices of the stated type, which are also referred to below as transverse vortices, since the mentioned vortex axis of the vortices extends essentially parallel to the main flow direction of the fluid, and the secondary flows of the vortex form as circular flow or approximately circular flow around the vortex axis, the vortex generator may have various designs. Thus, the vortex generator may be set up in such a way, for example, that at least two adjacent regions having different static pressures exist in at least one plane perpendicular to the main flow direction. This may be achieved in such a way, for example, that the vortex generator is set up to generate at least two adjacent regions having different flow cross sections, for example via different constrictions in a region through which the flow passes, so that the flow passes through these regions at different velocities according to the Bernoulli equation, and different pressures are formed in these regions. The formation of the secondary flows may then be a result of a compensation for these different pressures. For example, the vortex generator may be designed in such a way that at least two sections exist which have a different distance between the leading edge and a wall of the channel, i.e., sections having different flow cross sections.

These types of transverse vortices may be visualized, for example, with the aid of numerical fluid mechanics simulations in order to visually represent their existence. Alternatively, the vortices may be visualized, for example, with the aid of smoke and/or so-called smoke wire visualization, for example using a camera that records smoke turbulences in the flow and/or downstream from the vortex generator. In smoke wire visualization, a wire is provided with an oil-containing substance, for example, and is heated. During heating of the wire the substance evaporates, and upon separating from the wire immediately condenses in the surroundings, and the individual condensing particles become visible. The flow lines composed of these particles are then individually detectable, thus allowing good observation of the flow profile. Another method for visualizing the flow profile is the so-called particle image velocimetry (PIV). Flow visualization by PIV is based on the correlation of two digital recordings, offset in time, of a particle cloud in the light section. The result of the correlation is a two-dimensional vector field. The flow profile and the flow rate may be deduced on this basis.

Within the scope of the present invention, "in places" is understood to mean an arrangement which does not extend completely along or over the particular stated length or extension of the reference component or the direction, but, rather, which is provided only in sections or partially. In particular, the arrangement itself may have interruptions or recesses so that it has a segmented design.

Within the scope of the present invention, the sensor carrier may be completely or partially designed as a printed circuit board or may be part of a printed circuit board. For example, the printed circuit board may have an extension which forms the sensor carrier and protrudes into the channel, for example the measuring channel of a hot film air mass meter. The remaining portion of the printed circuit board may be accommodated, for example, in an electronics compartment, or in a housing of the sensor system or of a plug-in sensor of the sensor system.

Within the scope of the present invention, a printed circuit board is generally understood to mean an essentially plate-shaped element which may also be used as a support for electronic structures, for example circuit board conductors, terminal contacts, or the like, and which preferably also has one or more of these types of structures. In principle, at least slight deviations from the plate shape are also considered, and conceptually are included with same. The printed circuit board may be made, for example, of a plastic material and/or a ceramic material, an epoxy resin, for example, in particular a fiber-reinforced epoxy resin. In particular, the printed circuit board may be designed, for example, as a printed circuit board having circuit board conductors, in particular printed circuit board conductors (PCB).

In this way, the electronic module of the sensor system may be greatly simplified, and a base plate and a separate sensor carrier, for example, may be dispensed with. The base plate and sensor carrier may be replaced by a single printed circuit board on which, for example, a control and evaluation circuit of the sensor system may also be completely or partially situated. This control and evaluation circuit of the sensor system is used to control the at least one sensor chip and/or the evaluation of the signals generated by this sensor chip. Thus, by combining the mentioned elements, the complexity of manufacturing the sensor system may be significantly reduced, and the space requirement for the electronic module may be greatly reduced.

The sensor system may in particular have at least one housing, the channel being provided in the housing. For example, the channel may include a main channel and a bypass channel or measuring channel, whereby the sensor carrier and the sensor chip may be situated in the bypass channel or measuring channel, for example. In addition, the housing may have an electronics compartment which is separate from the bypass channel, the electronic module or the printed circuit board essentially being accommodated in the electronics compartment. The sensor carrier may then be designed as an extension of the printed circuit board which protrudes into the channel. In contrast to the complicated electronic modules known from the related art, this system is comparatively easy to implement technically.

In particular in the case in which a printed circuit board is used as the sensor carrier, but also in other cases and/or when other media are used as the sensor carrier, the sensor carrier may be designed, at least partially, as the multilayer sensor carrier. Thus, the sensor carrier may be designed in a so-called multilayer technique, and have two or more carrier layers joined together. For example, these carrier layers may once again be made of a metal, a plastic, or a ceramic material or a composite material, and joined together using joining techniques, for example gluing.

in this case, in which a multilayer technique is used having multiple sensor layers of the sensor carrier, the leading edge may have an at least partially stepped design against the main flow direction of the fluid medium as the result of different dimensioning of the carrier layers. The profiles may thus be implemented in at least an approximately stepped manner. For example, profiles in a section plane perpendicular to the extension plane of the sensor carrier may thus be provided with a shape that is rectangular or, approximated by a stepped shape, at least approximately circular, rounded, or wedge-shaped. The sensor chip may be situated on or in the sensor carrier in such a way that it is oriented perpendicularly to the local main flow direction. For example, the sensor chip may have a rectangular design, one side of this rectangle being perpendicular or essentially perpendicular, for example with an orientation that deviates by no more than 10 degrees from the vertical with respect to the local main flow direction.

The sensor chip may be electrically contacted via at least one electrical connection. For example, the sensor carrier, in particular a printed circuit board which forms the sensor carrier or an extension of this printed circuit board, may have one or multiple printed conductors and/or contact pads which are connected to corresponding contacts on the sensor chip, for example with the aid of a bonding process. In this case, the electrical connection may be protected by at least one cover and be separated from the fluid medium. This cover may in particular be designed as a so-called "glob top," for example as plastic drops and/or adhesive drops, which covers the electrical connection, for example the bond wires. In particular, influences on the flow by the electrical connection may also be avoided in this way, since the glob top has a smooth surface. In addition, the sensor chip may have at least one sensor area. This sensor area may be, for example, a sensor surface made, for example, of a porous ceramic material, and/or in particular may be a sensor diaphragm.

With the aid of the present invention, changes in the velocity field may be reduced compared to a new or initial state of the sensor system; in particular, however, regions of low velocity in the particle gathering area of the sensor area may be avoided or reduced. Over the service life of the sensor system, such low-velocity regions may be used as a collection point for increasingly larger numbers of particles. Since the particles change the tendency toward contamination and the heat transfer to the air, the following effects in particular are achieved by individual measures or by a combination of measures. The growth of the boundary layer due to contamination is avoided or at least reduced, since an effective reduction in the flow pulse in the vicinity of the sensor area is thus achieved. The vortex foci, specks of dust, or collection points which form in the region around the sensor area are avoided or at least reduced. Separations on the side of the sensor carrier facing the sensor chip as well as on the side of the sensor carrier facing away from the sensor chip are avoided or at least reduced. In addition, the aim is to avoid or at least reduce low-velocity regions which result from other causes. Furthermore, the measures are also suitable for nonstationary reverse flow states, i.e., pulsation in the intake tract. Via appropriate designs at the front and/or rear edge of the sensor carrier, the aim ideally is to adapt the bandwidths of the velocity fields to one another during the forward and reverse flow. As a side effect, the stabilizing measures result in smaller velocity fluctuations for the instantaneously measured mean value in the region of the sensor area, resulting in lower signal noise and better reproducibility.

With the aid of the present invention, for reducing the tendency toward particle contamination, secondary velocities may be generated or induced in the main flow, and/or low-velocity regions may be avoided on and in the immediate proximity of the sensor area, in particular of the micromechanical sensor diaphragm.

In addition, a topologically more exact definition of the flow field, including the boundary layer flow in the immediate proximity of the sensor area, in particular of the sensor diaphragm, is possible, i.e., avoidance of characteristics of the flow-defining structures, which change with the mass flow or flow states, such as, for example, stagnation points and saddle points, separation lines, vortex foci, variation of the wall shear stress over time, and the like. The avoidance of or reduction in the particle accumulation as well as the harmonization of the flow over the sensor area are achieved by the measures according to the present invention.

DETAILED DESCRIPTION OF THE INVENTION

Figure 1:
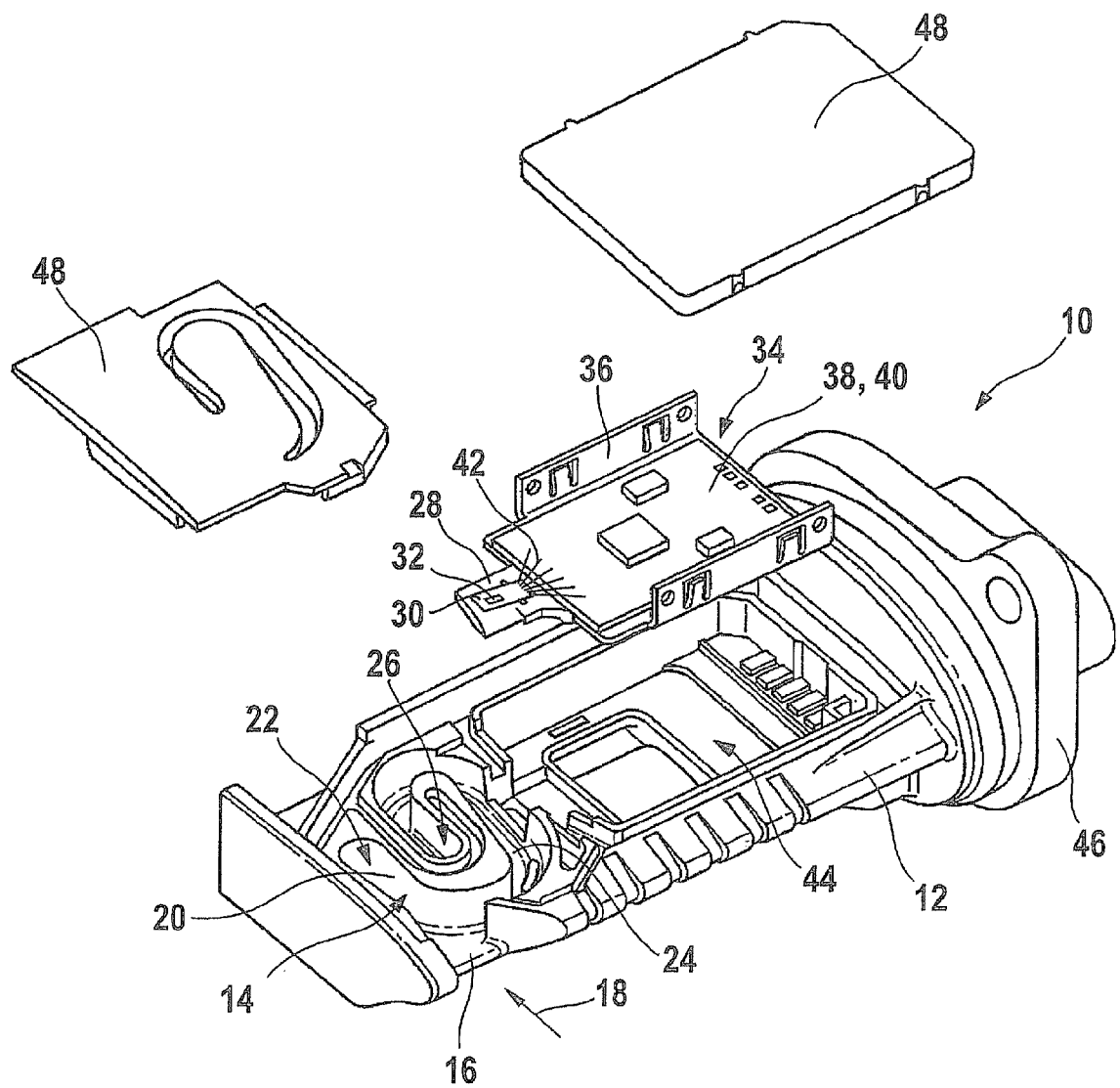
FIG. 1 shows a perspective illustration of a sensor system.

FIG. 1 shows a sensor system 10 for determining a parameter of a fluid medium. In the present exemplary embodiment, sensor system 10 is designed as a hot film air mass meter, and includes a plug-in part 12 which may plugged into a flow tube, for example, in particular an intake tract of an internal combustion engine. A channel structure 14, apparent in FIG. 1 or FIG. 4, is accommodated in plug-in part 12, through which a representative quantity of the fluid medium is able to flow through an inlet opening 16, which in the inserted state points toward a main flow direction 18 of the fluid medium.

Figure 4:
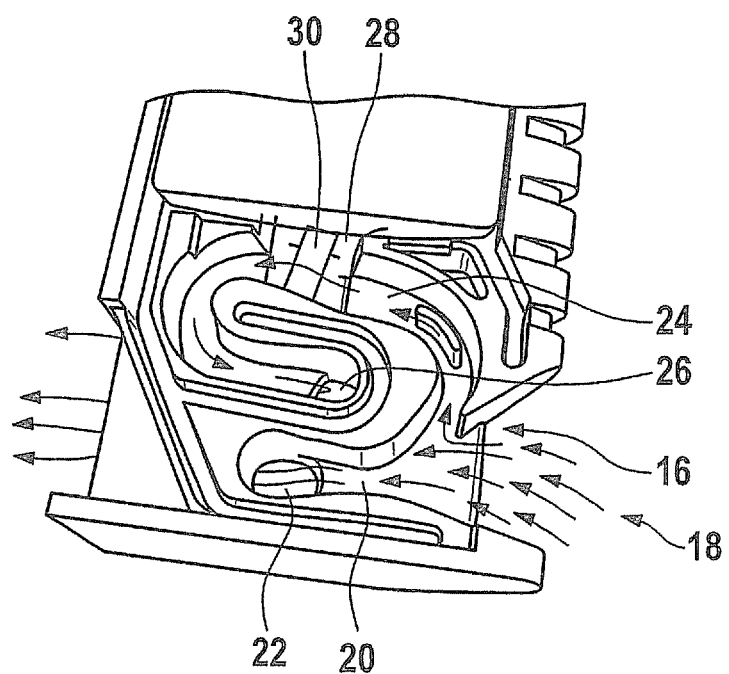
FIG. 4 shows an enlarged top view of an unclosed sensor housing together with the channel structure, and of the sensor carrier together with the sensor chip, and a schematic illustration of the flow through the channel.

FIG. 4 shows an enlarged detail of plug-in part 12 in the region of the channel structure. Channel structure 14 has a main channel 20 which opens into a main flow outlet 22 on the bottom side, relative to the illustration in FIG. 1, of plug-in part 12, and a bypass channel or measuring channel 24 which branches off from main channel 20 and opens into a bypass channel or measuring channel outlet 26 likewise situated on the bottom side, relative to the illustration in FIG. 1, of plug-in part 12, as is apparent from FIG. 4.

Figure 2:
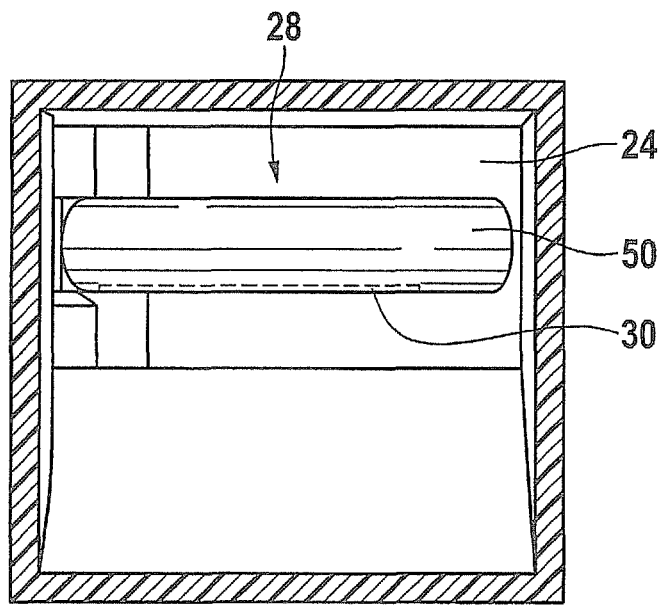
FIG. 2 shows a view of a sensor carrier together with a sensor chip in a channel, viewed in the main flow direction.
Figure 3:
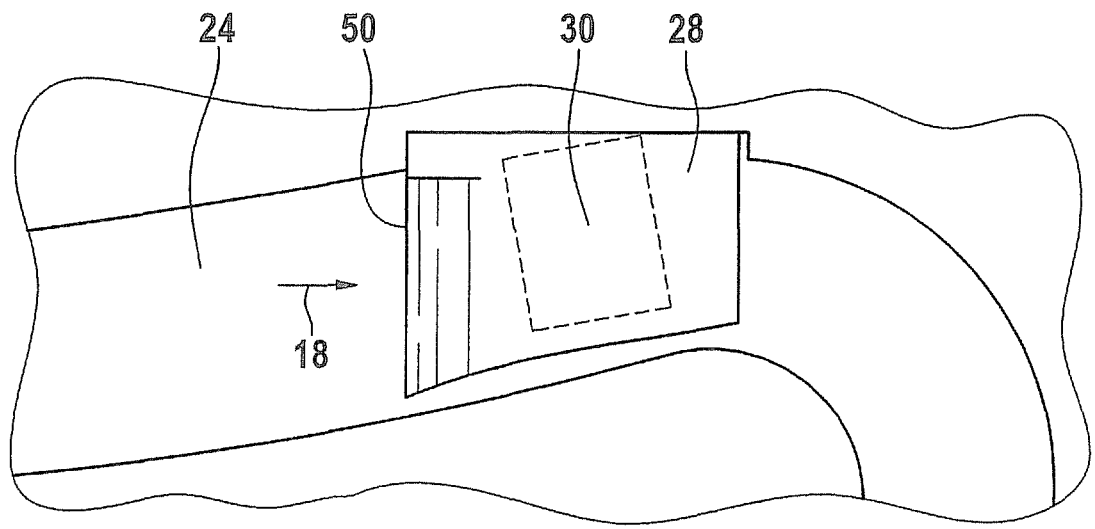
FIG. 3 shows a top view of a sensor carrier together with a sensor chip (back side) in a channel.

A sensor carrier 28 in the form of a wing protrudes into measuring channel 24, as illustrated in FIG. 1 and FIG. 2, for example. FIG. 2 shows the view of sensor carrier 28 in measuring channel 24 in the main flow direction. FIG. 3 shows a top view of the arrangement of sensor carrier 28 in measuring channel 24. A sensor chip 30 is embedded in this sensor carrier 28 in such a way that the fluid medium flows over a sensor diaphragm 32, which is designed as a sensor area of sensor chip 30. As is apparent in particular in FIG. 5, sensor carrier 28 together with sensor chip 30 is an integral part of an electronic module 34, illustrated in enlarged scale. This electronic module 34 has a bent base plate 36 as the sensor carrier, and a printed circuit board 38 mounted, for example glued, thereon, having a control and evaluation circuit 40. Sensor carrier 28 may be molded onto base plate 36, for example as a plastic component.

Figure 5:
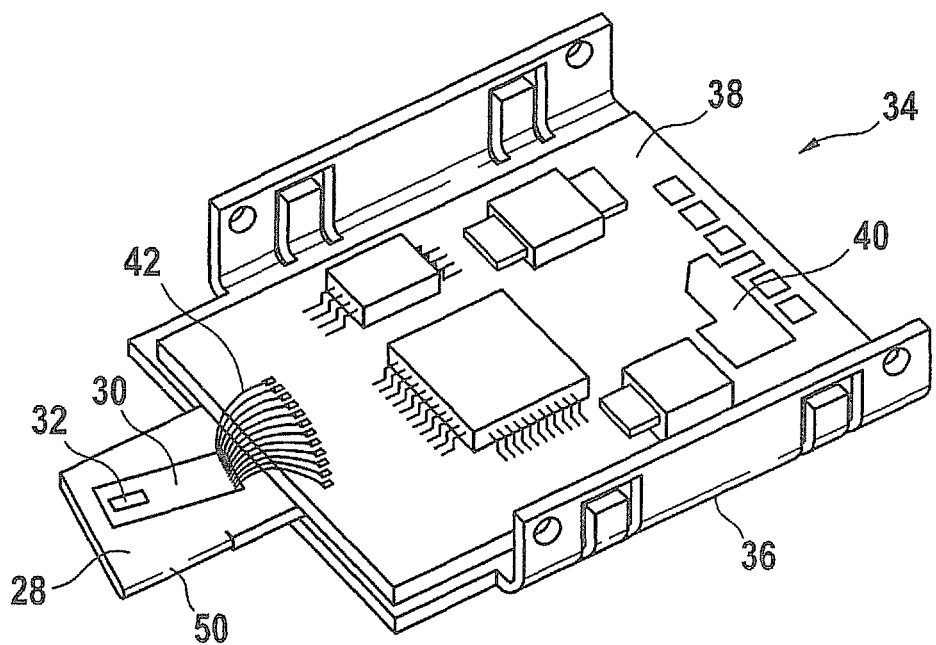
FIG. 5 shows an enlarged illustration of an electronic module of the sensor system, together with the sensor carrier and the installed sensor chip.

The sensor chip is electrically connected to control and evaluation circuit 40 via electrical connections 42, in the present case designed as wire bonding, as is apparent in particular from FIG. 5. Resulting electronic module 34 is introduced, for example glued, into an electronics compartment 44 in a housing 46 of plug-in part 12 in which channel structure 14 is also provided, as is apparent in FIG. 1. This is carried out in such a way that sensor carrier 28 protrudes into channel structure 14. Electronics compartment 44 and channel structure 14 are subsequently closed by lid 48.

Sensor carrier 28, which is molded onto base plate 36 as an injection-molded component, for example, or which may be an integral part of base plate 36 or printed circuit board 38, is provided with a leading edge 50, which may have a rounded design, as is apparent from FIG. 2, for example. For example, this leading edge 50 may be implemented similarly to an airfoil with a constant contour. The specific embodiments of sensor carrier 28 according to the present invention are described in greater detail below. First, however, the fluid mechanics correlations of cross-sectional changes in a channel, for example measuring channel 24, with the aid of vortex generators, for example ramps, steps, or blocks, are explained in order to clarify the conceptual approach, underlying the present invention, of the various specific embodiments of the sensor carrier. In particular, the explanation as an example is intended to illustrate the principle of using cross-sectional changes of certain sections or regions in a channel to intentionally form secondary flows such as longitudinal vortices, for example.

Figure 6A:
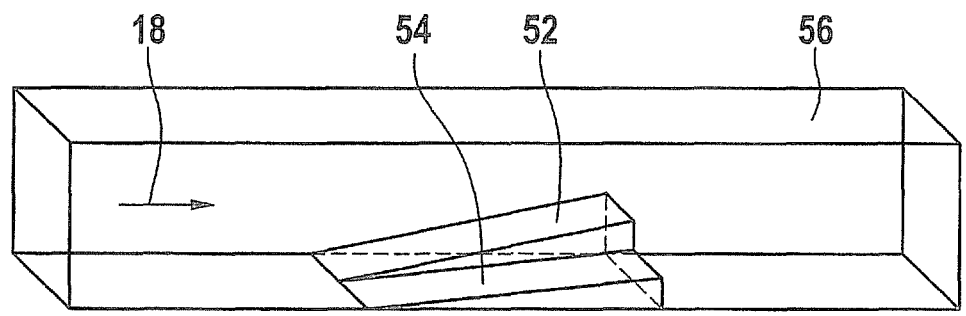
FIG. 6A shows a perspective view of a ramp pair for generating a secondary flow in a rectangular channel.
Figure 6B:
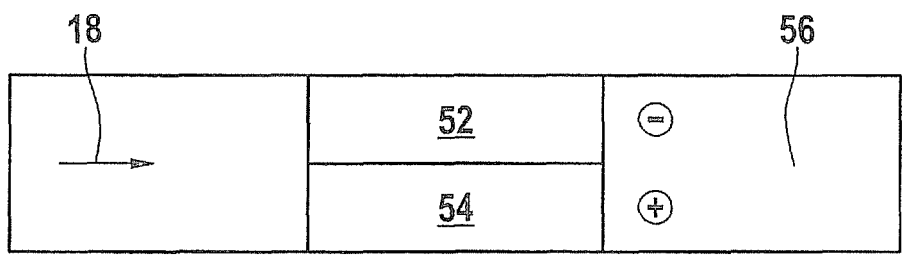
FIG. 6B shows a top view of the ramp pair in the rectangular channel, and a schematic illustration of the distribution of the static pressure.

As an example, FIGS. 6A and 6B show a ramp pair 52, 54 of different heights in a rectangular channel 56, FIG. 6A illustrating an arrangement in perspective view with flow from the left, and FIG. 6B illustrating a corresponding top view with a schematic illustration of the distribution of the static pressure. Thus, main flow direction 18 is parallel to the longitudinal axis of rectangular channel 56 from left to right according to the illustrations in FIGS. 6A and 6B. According to the Bernoulli equation, the static pressure decreases in the region of a flow which is accelerated to a higher velocity. The flow is accelerated to a greater degree in the region of higher ramp 52 than in the region of lower ramp 54. Accordingly, the static pressure is lowered to a greater degree in the region of higher ramp 52. In relative terms, the static pressure in the region of lower ramp 54 is greater than that in the region of higher ramp 52. This is indicated by the symbols "+" and "−" in FIG. 6B. Due to the ramp geometries and the different static pressures, velocity components, also referred to as secondary velocity components, result in the plane perpendicular to main flow direction 18, and vortices 55A, 55B form downstream from ramps 52, 54, respectively, as is apparent from FIG. 7A or FIG. 7B, for example, in order to equalize the pressures. In particular, the vortex axis of vortices 55A, 55B extends essentially parallel to main flow direction 18. In particular, two vortices 55A, 55B result in this arrangement, a larger vortex 55A having a clockwise rotational direction and extending essentially over the entire cross section of channel 56, and a smaller vortex 55B, in a region downstream from larger ramp 52 having a counterclockwise rotational direction, and whose profile in terms of surface area or extent of spreading being essentially identical to the cross-sectional area of higher ramp 52.

Figure 7A:
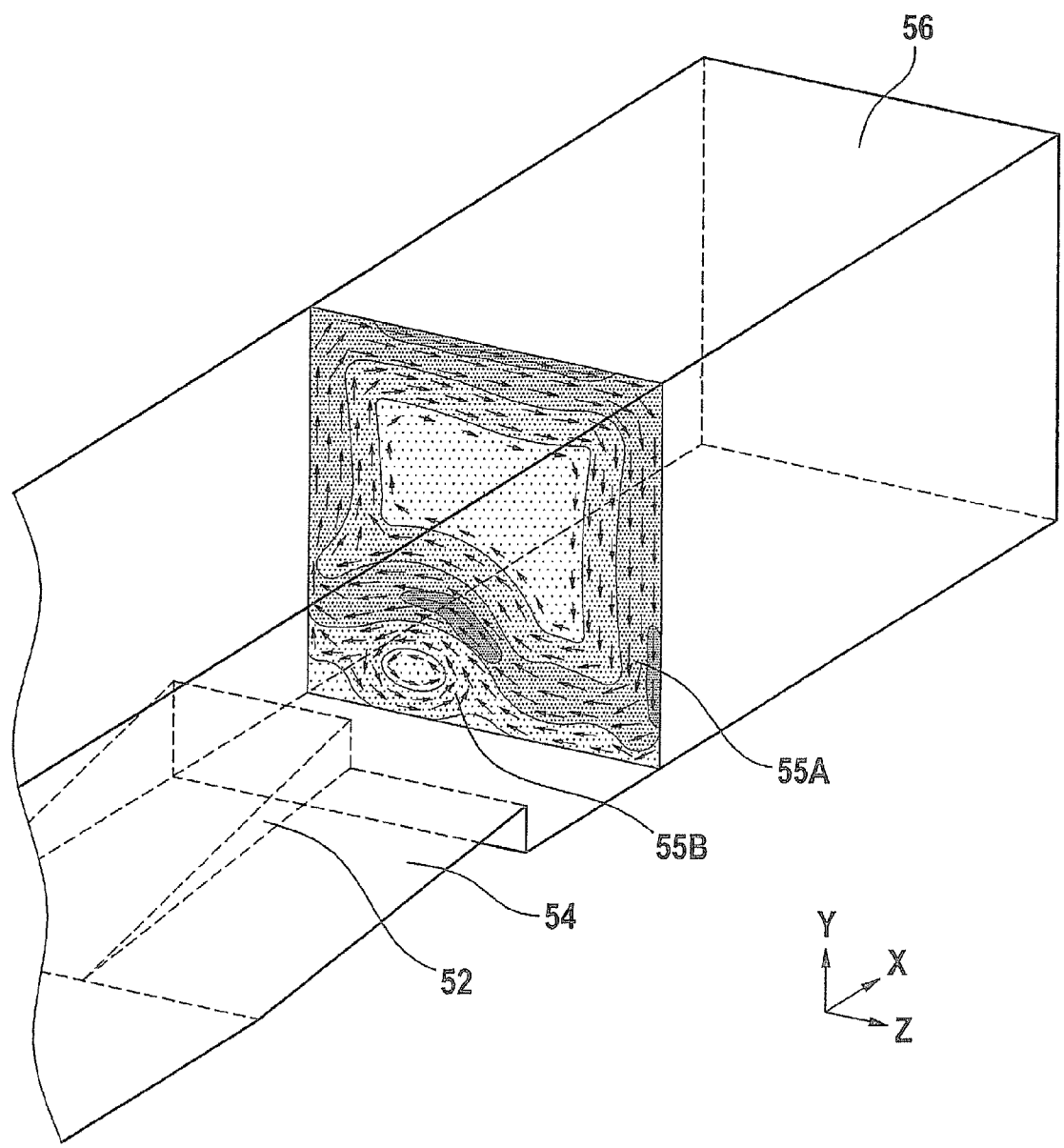
FIG. 7A shows a perspective view of a secondary flow field downstream from the ramp pair in the rectangular channel.
Figure 7B:
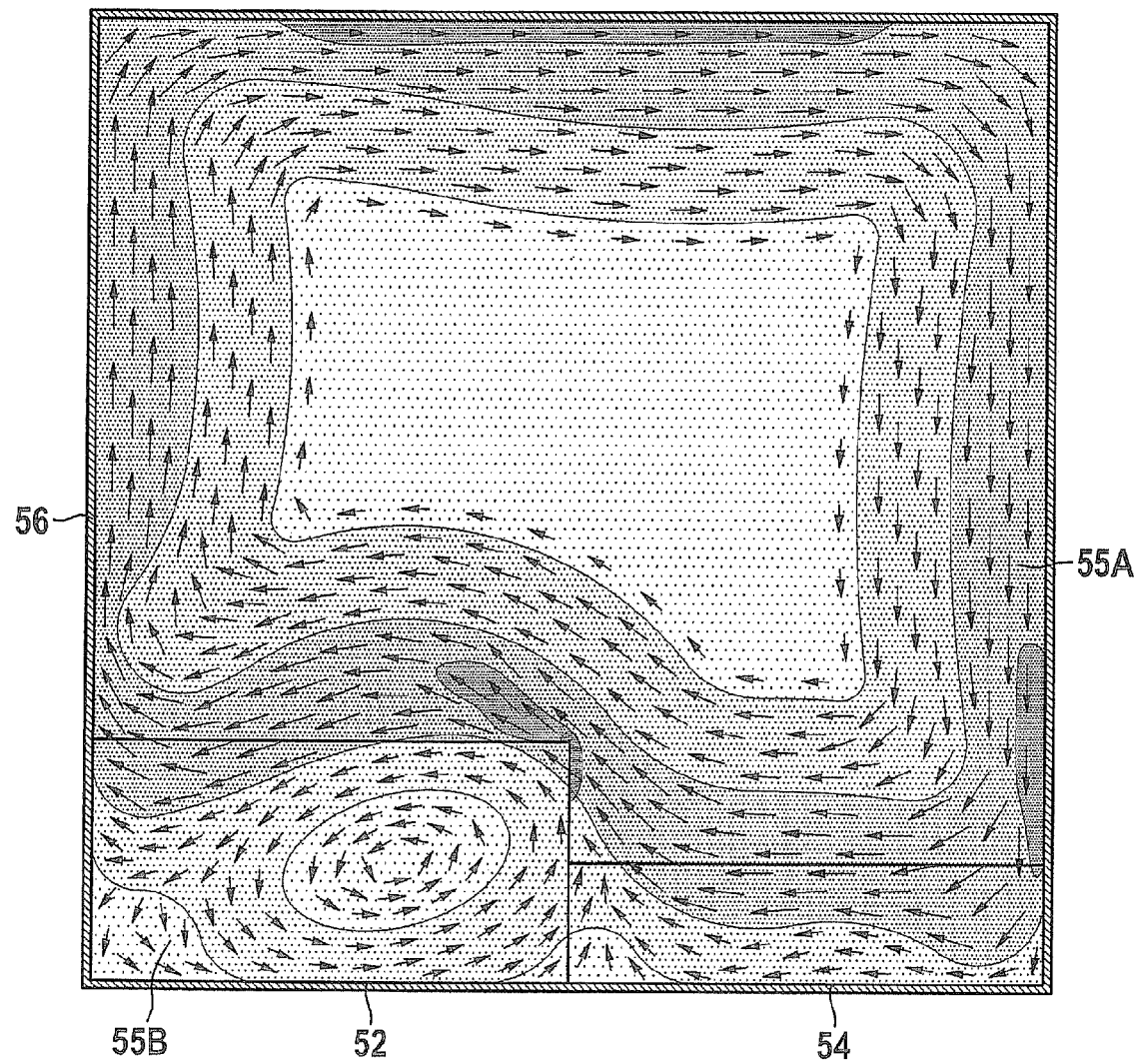
FIG. 7B shows a view of the secondary flow field downstream from the ramp pair in the rectangular channel, viewed in the main flow direction.

FIG. 7A shows a perspective view of this type of velocity field of vortices 55A, 55B in a plane perpendicular to main flow direction 18, and FIG. 7B shows a top view of this projected velocity field plane of these vortices 55A, 55B downstream from ramp pair 52, 54, respectively, as a result of a numerical flow simulation. The regions of the particular velocity fields are surrounded by thin lines for better distinguishability and delimitability. The lengths of the vectors of the velocity field indicate the particular magnitude of the velocity projected into the plane, a greater length of a vector indicating a higher velocity.

Figure 7C:
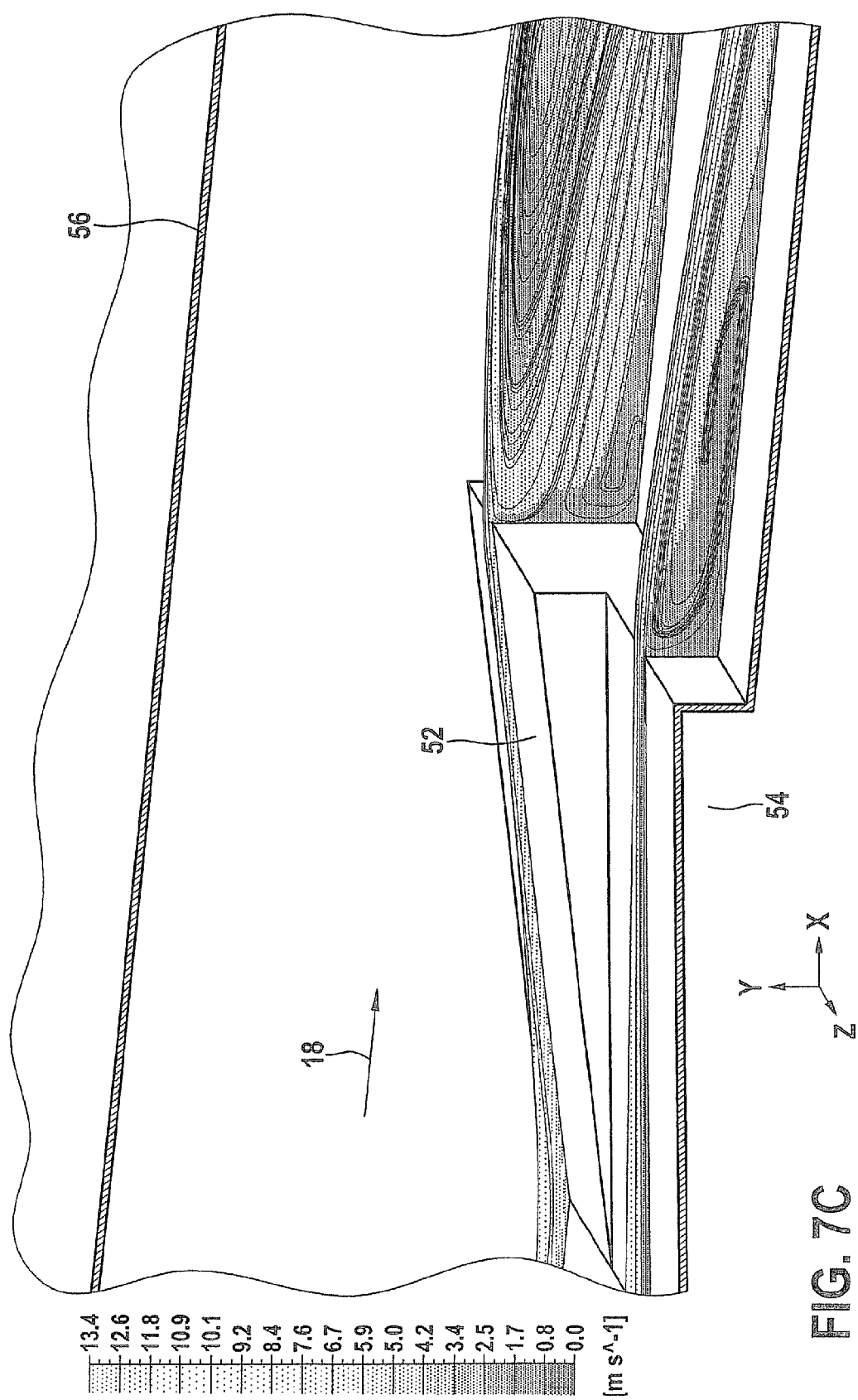
FIG. 7C shows another perspective view of the ramp pair, with an illustration of the velocities and flow lines.

A number of effects may be identified here. Areas of low flow rate are located directly downstream from such projections, for example steps, ramps, and the like. The component in main flow direction 18 is much smaller than in the core flow region, and so-called "dead water areas" having small velocity components exist which may even point against the main flow, i.e., back-flow in negative main flow direction 18, as shown in FIG. 7C, for example. FIG. 7C shows the velocities and the flow lines in a perspective side view at the level of the particular ramp, the differently dotted regions of the flow lines indicating the particular magnitude of the velocity. The illustration in FIG. 7C also shows a coordinate system, main flow direction 18 being indicated on the axis denoted by X, and the axes denoted by Y and Z defining a plane perpendicular to main flow direction 18. According to the above definition, an orientation transverse to main flow direction 18 is therefore located in the Y-Z plane. The secondary velocities in the stated plane perpendicular to the main flow, i.e., in the Y-Z plane of FIG. 7C, are also low. Thus, there is a higher probability of accumulation of particles in such low-velocity regions. The arrangement of micromechanical sensor diaphragm 32 would therefore most probably result in increased contamination and characteristic curve drift. In addition, above-mentioned vortices 55A, 55B having a vortex axis essentially parallel to the main flow direction result downstream from or behind larger ramp 52. At the transition to lower ramp 54, an upwardly directed secondary flow of larger vortex 55A with respect to larger ramp 52 exists, which in this region is partially overlapped by the secondary flow of smaller vortex 55B or is intermixed with same, and which has the same direction, or at a further distance from the wall has a strong secondary flow upward, i.e., in the direction of the elevation of ramps 52, 54, and facing away from lower ramp 54, as shown in FIG. 7D.

Figure 7D:
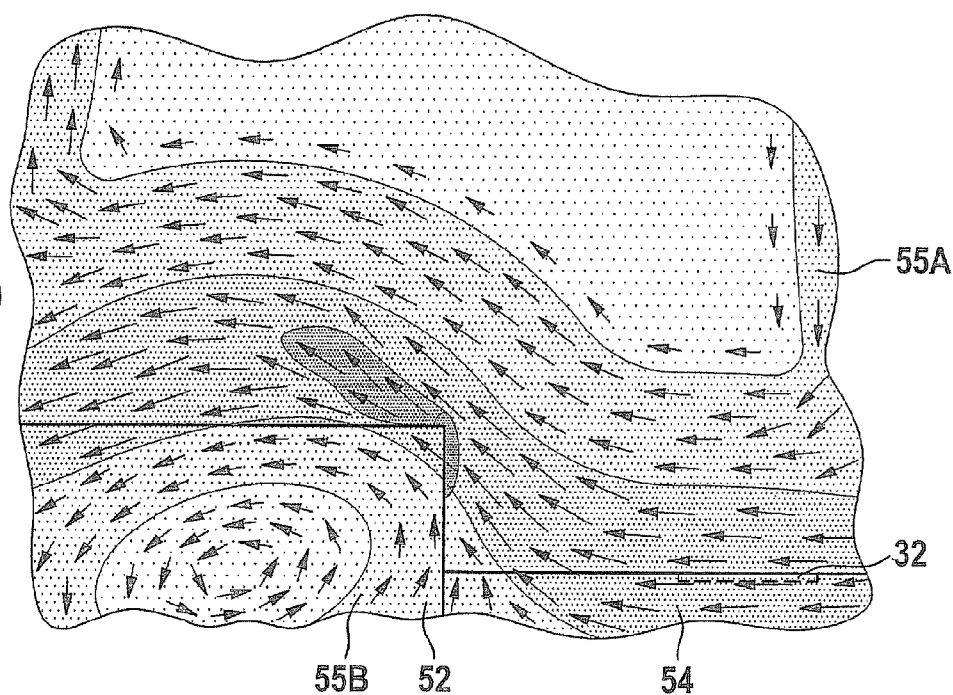
FIG. 7D shows an enlarged detail of the secondary flow field in the region of the transition between the ramps.

FIG. 7D schematically shows a detail of the transition from such a higher projection to a lower projection, projected into the stated plane perpendicular to main flow direction 18, and one possible arrangement of a micromechanical sensor diaphragm 32 in the region of the secondary velocities of larger vortex 55A. On account of the secondary flow, which is present even at low velocities, there should be no accumulation of particles in the region of sensor diaphragm 32; instead, the particles should be carried away from sensor diaphragm 32 due to generated vortex 55A. Thus, in overall rectangular channel 56 at least a pronounced secondary flow results in the plane perpendicular to main flow direction 18 due to ramps 52, 54, which are large relative to the channel dimensions. Due to the size ratios in the bypass channel of the hot film air mass meter, such a clockwise secondary flow of larger vortex 55A according to the illustration in FIG. 7D is distributed not over the entire sensor carrier, but, rather, only locally in the region of micromechanical sensor diaphragm 32, since the dimensions of the corresponding interfering bodies are only of the order of magnitude of sensor carrier 28, possibly only of the order of magnitude of sensor chip 30 or of micromechanical sensor diaphragm 32. Therefore, the resulting secondary flows should not be confused with turbulent, additional velocity fluctuations which may also form over the entire sensor carrier, transverse to the main flow direction, but which have significantly smaller absolute values of velocity compared to the above-described secondary flows. The present invention is therefore directed to influencing the path of the light particles which are not filtered out by the deflection by centrifugal force or by adherence to the bypass channel walls, or which have extreme deviations from main flow direction 18 due to bouncing against the bypass channel walls. The aim is to keep such particles away from sensor diaphragm 32 as the result of the geometrically induced secondary velocities.

Figure 8A:
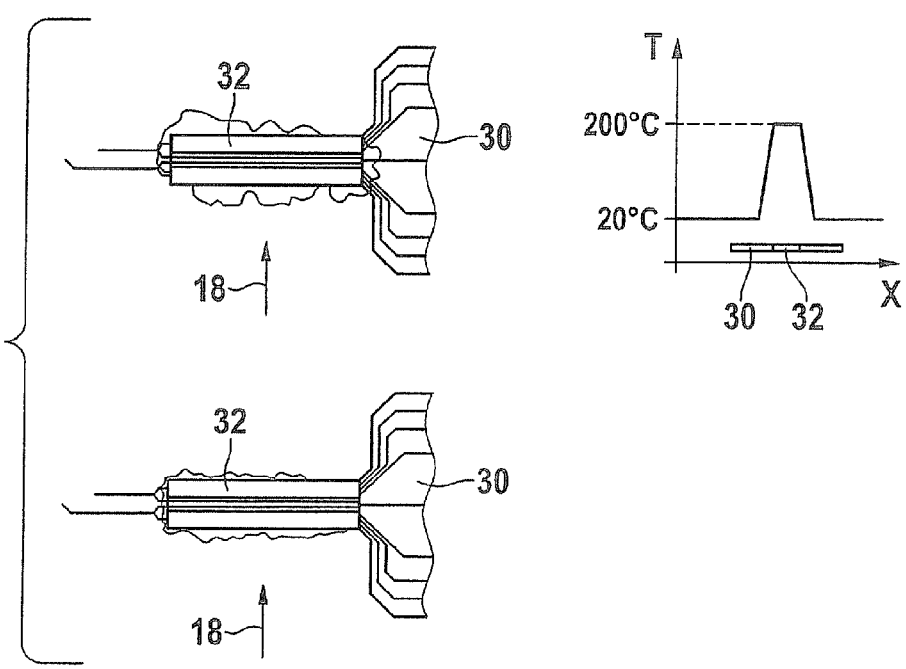
FIG. 8A shows a top view of sensor chips of two different sensor carriers, and the illustration of a temperature distribution in the main flow direction, without chip heating.
Figure 8B:
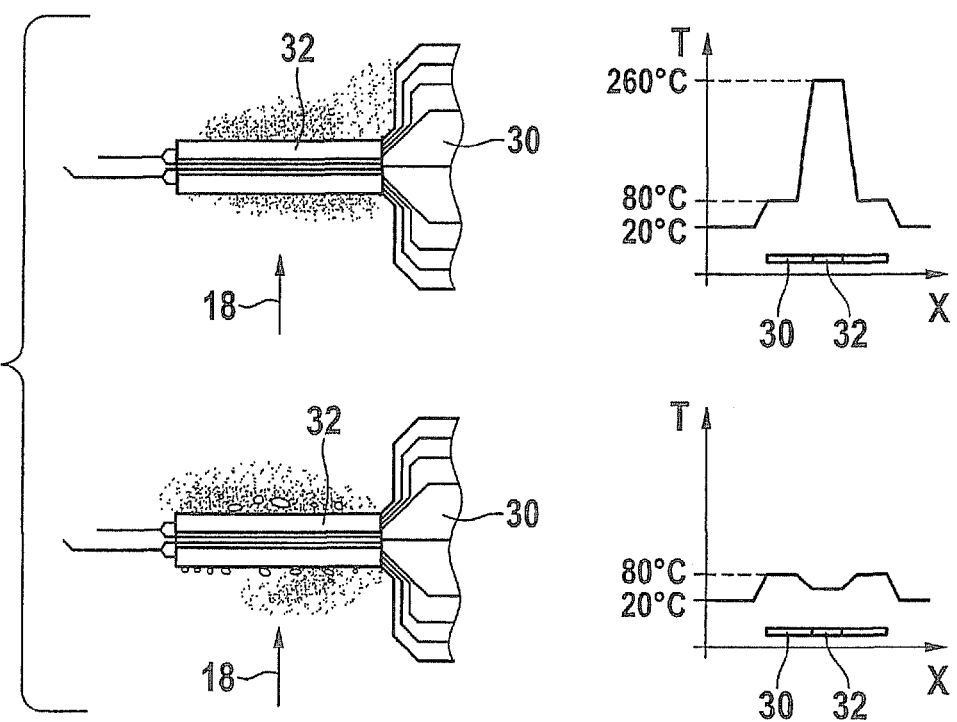
FIG. 8B shows a top view of sensor chips of two different sensor carriers, and the illustration of two temperature distributions in the main flow direction, with chip heating.

The reduction in the tendency toward contamination due to the explained principle and the specific embodiments of sensor carrier 28 described below requires a certain flow rate. Using the measures described below, there is only a very limited possibility of preventing contamination due to oil vapor at very low velocities, which occurs, for example, as the result of crankcase venting when a motor vehicle is switched off. For this case, so-called chip heating may be provided. FIG. 8A shows two top views of a sensor chip 30 of two different sensor carriers 28 without chip heating, main flow direction 18 being indicated by an arrow, and a temperature distribution over main flow direction 18 being plotted on the axis denoted by X. The top views of sensor chips 30 clearly show the accumulations of oil droplets, in particular in the region around sensor diaphragm 32, in the lower illustration the oil droplets being smaller or more finely distributed compared to the upper illustration. FIG. 8B shows two top views of a sensor chip 30 of two different sensor carriers 28 with chip heating, main flow direction 18 being indicated by an arrow, and two associated temperature distributions as the result of different heating modes over main flow direction 18 being plotted on the axis denoted by X. When the chip heating is switched on, a reduction in the entry of oil is clearly apparent, as is discernible from FIG. 8B, for example. In normal operation of an internal combustion engine, for example an internal combustion engine of a motor vehicle, primarily dust and soot particles adhere to the oil droplets, resulting in an altered heat transport, and therefore, in a characteristic curve drift. The aim of the present invention is not to avoid oil accumulation during crankcase venting when the engine is switched off, but, rather, the subsequent accumulation of particles. However, it is pointed out that aerodynamic forces counteract the mechanisms of oil contamination when the engine is switched off, even at very low flow rates. The stated possibility for reducing the entry of oil by chip heating is mentioned only as one optional, additional possibility for reducing the particle accumulation.

The individual specific embodiments of sensor carrier 28, using the principle of the targeted change in flow with the aid of design measures, are described in detail below. Use of the change in geometry is conceivable for the inflow side, which is important for normal operation, as well as for the outflow side, which is important for pulsing flow.

Figure 9A:
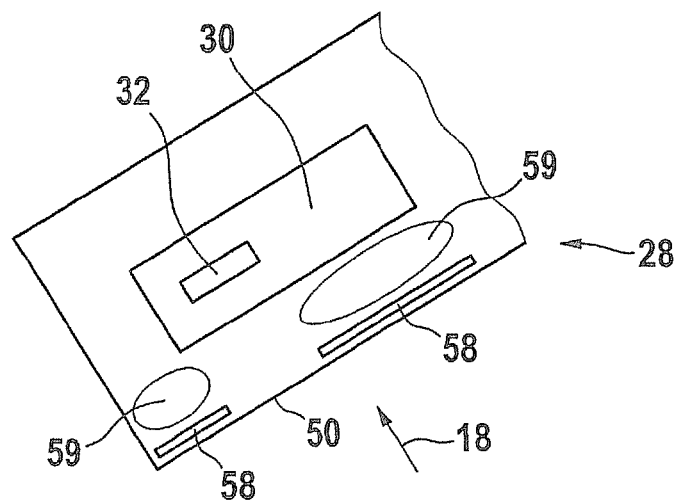
FIG. 9A shows a top view of a first specific embodiment of a sensor carrier.
Figure 9B:
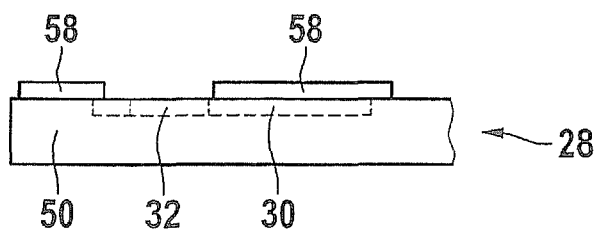
FIG. 9B shows a view of the first specific embodiment of the sensor carrier, viewed in the main flow direction.

FIG. 9A shows a top view of a first specific embodiment of a sensor carrier 28 according to the present invention, and FIG. 9B shows a side view, viewed in main flow direction 18. According to the first specific embodiment, two vortex generators 58 which are set up to generate secondary flows or to induce same in the main flow direction, and which therefore may also be referred to as secondary flow generators, are provided, and as cuboidal and/or web-shaped projections protrude essentially perpendicularly from the plane of sensor carrier 28. In particular, vortex generators 58 are situated on sensor carrier 28, in the region of leading edge 50, in such a way that sensor diaphragm 32 projects into the plane perpendicularly to main flow direction 18, situated between vortex generators 58, as is apparent from the illustration in FIG. 9B. According to the projected illustration in FIG. 9B, one vortex generator 58 is thus located to the left of sensor diaphragm 32, and the other vortex generator 58 is located to the right of sensor diaphragm 32. In the illustration shown in FIG. 9A, vortex generators 58 have a relatively small depth; i.e., their dimension viewed in main flow direction 18 is relatively small compared to their other dimensions. Downstream from these vortex generators 58 as viewed directly in main flow direction 18, low-velocity regions 59, indicated by two ellipses, result on sensor carrier 28. Vortex generators 58 generate regions of higher velocity and lower pressure due to the thickening of the boundary layers in their trailings to the left and right of sensor diaphragm 32, and therefore slightly farther downstream than the regions indicated by the ellipses, so that the flow region upstream from and above sensor diaphragm 32, starting from the center of sensor diaphragm 32, has outwardly directed secondary velocities. In addition, oppositely rotating vortices 55 result to the left and right of sensor diaphragm 32 whose vortex axes extend essentially parallel to the main flow direction and which drive the particles from sensor diaphragm 32 outwardly and upwardly in each case, i.e., into the more rapid main flow. The height and the width, the extension in main flow direction 18, or the position of the inner edge of the vortex generators relative to the position of sensor diaphragm 32 may vary.

Figure 10:
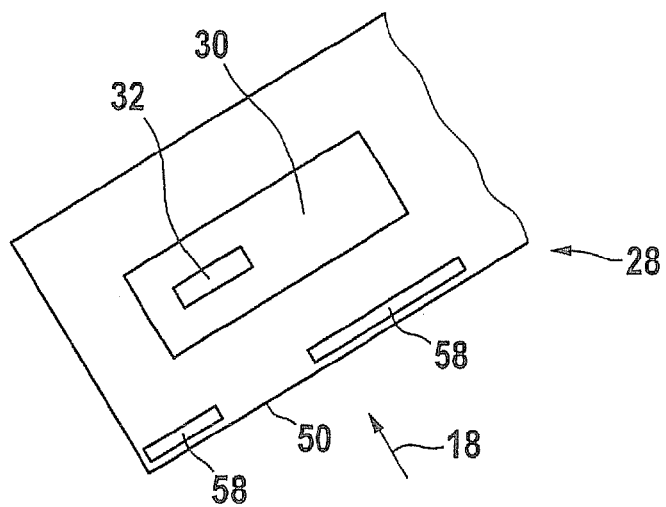
FIG. 10 shows a top view of a second specific embodiment of a sensor carrier.

FIG. 10 shows an illustration of a second specific embodiment which corresponds to the illustration in FIG. 9A. The second specific embodiment represents a modification of the first specific embodiment. Only the differences from the first specific embodiment are described below, and identical components are provided with the same reference numerals. In comparison to the first specific embodiment, vortex generators 58 have a greater depth in main flow direction 18. Vortex generators 58 of the second specific embodiment bring about similar effects as those described for the first specific embodiment. The strength of the secondary flow should increase compared to the first specific embodiment.

Figure 11:
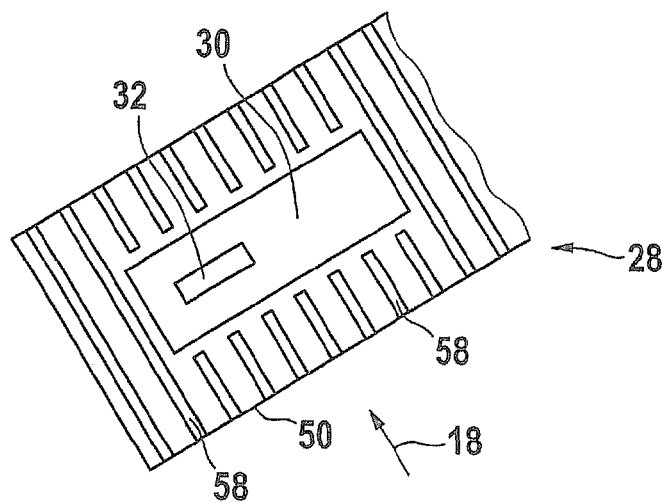
FIG. 11 shows a top view of a third specific embodiment of a sensor carrier.

A third specific embodiment is shown in FIG. 11 in a top view. Only the differences from the preceding specific embodiments are described below, and identical components are provided with the same reference numerals. In the third specific embodiment a plurality of vortex generators 58 is provided, the vortex generators being situated on sensor carrier 28, parallel to one another in main flow direction 18, and protruding essentially perpendicularly from the plane of sensor carrier 28. Vortex generators 58 are designed as cuboidal and/or web-shaped projections, for example. In addition, vortex generators 58 which are located in the region of sensor chip 30 in a direction transverse to main flow direction 18, viewed in or parallel to the plane of sensor carrier 28, each have an interruption or a recess within which sensor chip 30 is situated. In particular, vortex generators 58 which have an interruption or a recess do not terminate in flush alignment with sensor chip 30, but, rather, are located at a small distance from sensor chip 30 in and against main flow direction 18. In the remaining regions of sensor carrier 28, vortex generators 58 have a consistent design from leading edge 50 to the rear edge of sensor carrier 28, viewed in main flow direction 18. A single or multiple interruption is conceivable. In the third specific embodiment, vortex generators 58 have a relatively small width: i.e., their dimension transverse to main flow direction 18 in or parallel to the plane of the sensor carrier is relatively small compared to their other dimensions. Alternatively or additionally, grooves and/or protruding steps may be provided, which due to their consistency conduct the flow, and which in particular in the case of pulsation are designed to prevent uncontrolled lateral entry of particles. At the same time, these types of grooves are used for runoff of any oil which is deposited despite chip heating. The height of the protruding steps may be constant, or may also increase in a curved manner in main flow direction 18, or in some cases may assume other suitable profiles, in particular in the vicinity of sensor diaphragm 32.

Figure 12:
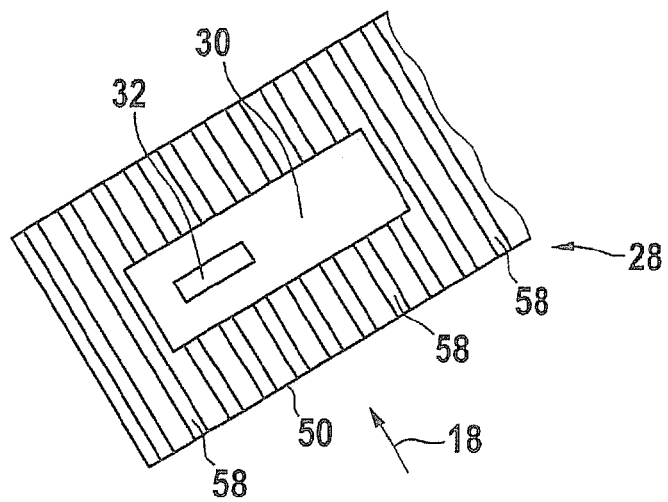
FIG. 12 shows a top view of a fourth specific embodiment of a sensor carrier.

FIG. 12 shows an illustration of a fourth specific embodiment corresponding to the illustration in FIG. 11. The fourth specific embodiment represents a modification of the third specific embodiment. Only the differences from the third specific embodiment are described below, and identical components are provided with the same reference numerals. Vortex generators 58 have a greater width compared to the third specific embodiment. In addition, vortex generators 58, which have an interruption or a recess, terminate in flush alignment with sensor chip 30. Vortex generators 58 in the fourth specific embodiment bring about similar effects as those described for the third specific embodiment.

Figure 13:
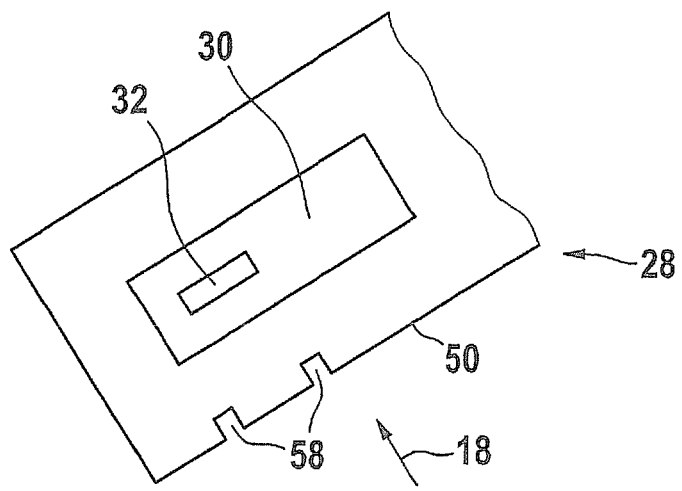
FIG. 13 shows a top view of a fifth specific embodiment of a sensor carrier.

A fifth specific embodiment is shown in FIG. 13 in a top view. Only the differences from the preceding specific embodiments are described below, and identical components are provided with the same reference numerals. In the fifth specific embodiment, two vortex generators 58 which are designed as spaced-apart milled grooves or recesses, for example having a rectangular, semicircular, or square design in a top view, in sensor carrier 28 are located in the region of leading edge 50. In particular, vortex generators 58 are situated on sensor carrier 28 in the region of leading edge 50 in such a way that sensor diaphragm 32, which projects into a plane perpendicular to main flow direction 18, is situated between vortex generators 58.

Due to the stagnation point effect of milled grooves 58, the fifth specific embodiment produces a thicker boundary layer in the trailings of milled grooves 58, downstream from milled grooves 58 at the leading edge, compared to the flow course outside milled grooves 58 at leading edge 50, which is rounded similar to an airfoil profile, and thus has the same effect as an actually present step geometry according to the above-described specific embodiments. Secondary velocities and oppositely rotating vortices 55, each having a vortex axis parallel to main flow direction 18, likewise form as described above.

Figure 14:
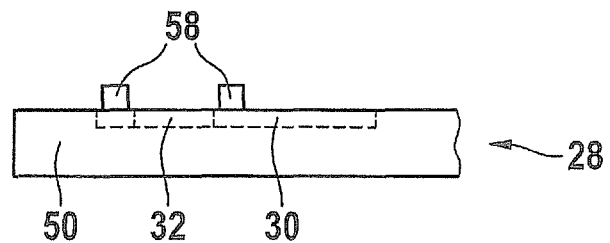
FIG. 14 shows a view of a sixth specific embodiment of a sensor carrier, viewed in the main flow direction.

A sixth specific embodiment is shown in FIG. 14 in a view in the main flow direction. Only the differences from the preceding specific embodiments are described below, and identical components are provided with the same reference numerals. In the sixth specific embodiment, similarly to the fourth specific embodiment, two vortex generators 58 are provided on sensor carrier 28, parallel to one another in main flow direction 18, and protrude essentially perpendicularly from the plane of sensor carrier 28. Vortex generators 58 are designed, for example, as cuboidal and/or web-shaped projections. In particular, vortex generators 58 are situated on sensor carrier 28 in such a way that sensor diaphragm 32, which projects in a plane perpendicular to main flow direction 18, is situated between vortex generators 58. In the sixth specific embodiment, vortex generators 58 are comparatively high and wide. In the sixth specific embodiment shown in FIG. 14, not only variations in the position and the number, but also asymmetrical arrangements due to the incoming flow which concern the width, height, or height profile are conceivable. In addition, other shapes are conceivable in the shape transverse to main flow direction 18. For example, vortex generators 58 shown as projections may also be semicircular, or be provided with radii at both edges.

Figure 15:
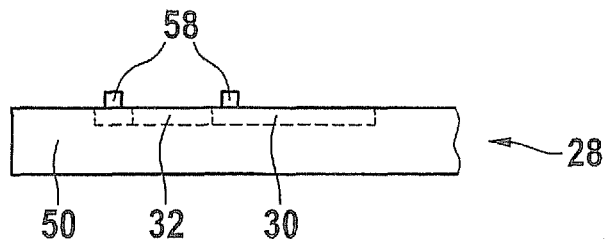
FIG. 15 shows a view of a seventh specific embodiment of a sensor carrier, viewed in the main flow direction.

FIG. 15 shows an illustration of a seventh specific embodiment corresponding to the illustration in FIG. 14. The seventh specific embodiment represents a modification of the sixth specific embodiment. Only the differences from the sixth specific embodiment are described below, and identical components are provided with the same reference numerals. In comparison to the sixth specific embodiment, vortex generators 58 have a smaller width and height. Vortex generators 58 in the seventh specific embodiment bring about similar effects as described for the sixth specific embodiment, and may likewise have the design alternatives described therein.

Figure 16:
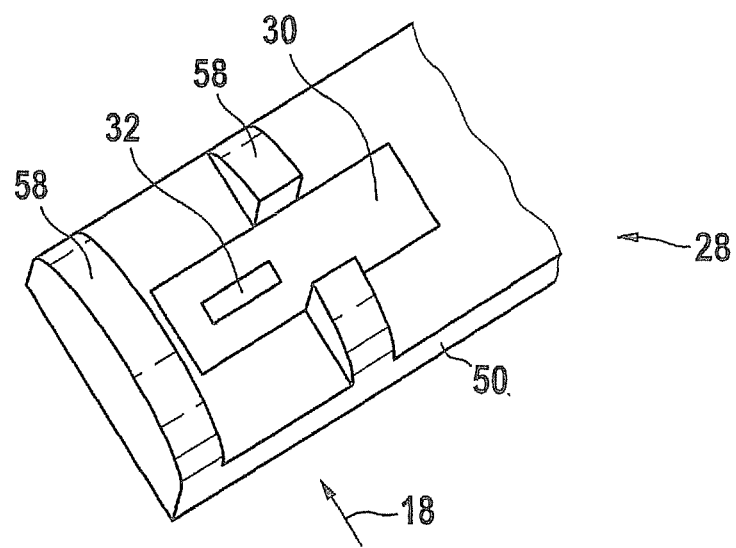
FIG. 16 shows a perspective view of an eighth specific embodiment of a sensor carrier.

FIG. 16 shows an illustration of an eighth specific embodiment in a perspective top view. The eighth specific embodiment represents a modification of the sixth or seventh specific embodiment. Only the differences from the sixth or seventh specific embodiment are described below, and identical components are provided with the same reference numerals. In comparison to the sixth or seventh specific embodiment, the two vortex generators 58 are curved in main flow direction 18; i.e., their height increases in main flow direction 18, viewed from leading edge 50, toward sensor chip 30, and downstream from sensor chip 30 the height decreases in main flow direction 18 toward the rear edge. In particular, a vortex generator 58 has a consistent design, and that vortex generator 58 which is located in the region of the sensor chip 30, in a direction transverse to main flow direction 18, viewed in or parallel to the plane of sensor carrier 28, has an interruption or a recess within which sensor chip 30 is situated. Vortex generators 58 in the eighth specific embodiment bring about similar effects as described for the sixth specific embodiment, and may likewise have the design alternatives described therein.

Figure 17:
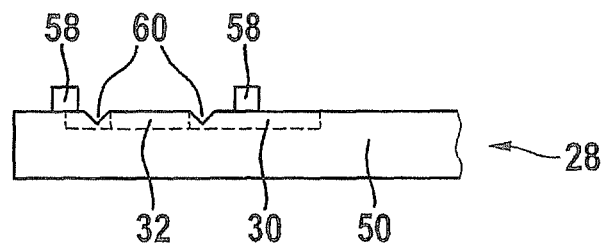
FIG. 17 shows a view of a ninth specific embodiment of a sensor carrier, viewed in the main flow direction.

A ninth specific embodiment is shown in FIG. 17 in a side view in main flow direction 18. The ninth specific embodiment represents a modification of the sixth or seventh specific embodiment. Only the differences from the sixth or seventh specific embodiment are described below, and identical components are provided with the same reference numerals. In the ninth specific embodiment, in addition to the two vortex generators 58, two grooves 60 are provided which extend in the sensor carrier between vortex generators 58 from leading edge 50 to the rear edge of sensor carrier 28, viewed in main flow direction 18, in such a way that sensor diaphragm 32 is located between grooves 60. This takes into account the fact that oil accumulations upstream and downstream from sensor diaphragm 32 change the boundary layer in the immediate proximity of sensor diaphragm 32. Changes in the heat transport from sensor diaphragm 32 into the air are therefore to be expected. With the correct design, grooves 60 in the uncontaminated state should play no role for the boundary layer, since they contain only low-pulse fluid. In the case of contamination, however, grooves 60 should receive oil droplets and prevent actual local thickening of the effective flow contour in front of or upstream from sensor diaphragm 32.

The embodiments of sensor carrier 28 according to the present invention may have other appropriate modifications or design alternatives. In particular, it is explicitly emphasized that combinations of the described geometries of vortex generators 58 are also possible.

Figure 18A:
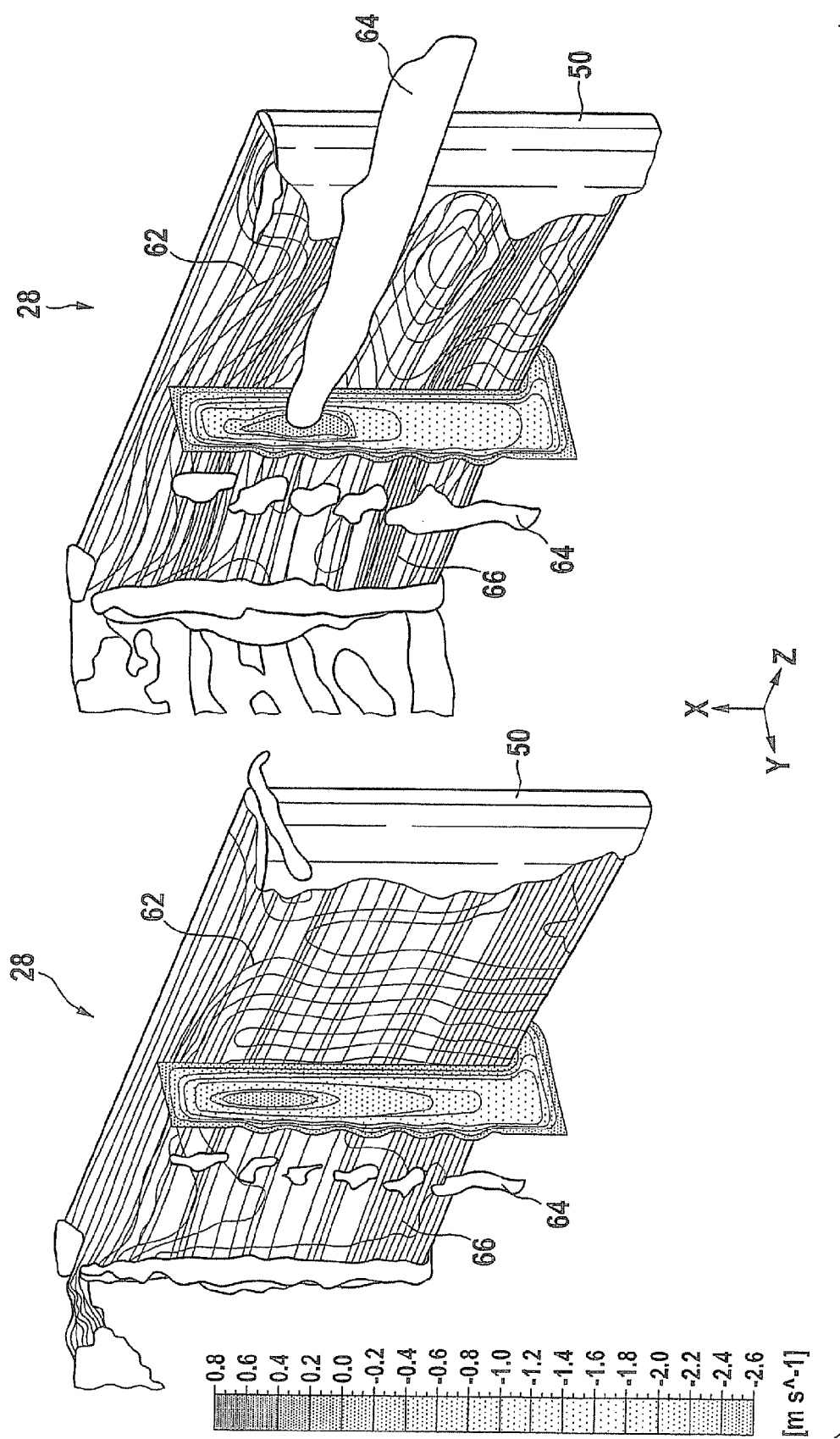
FIG. 18A shows two results of a flow simulation, using different air mass flows, without a sensor system according to the present invention, in which the velocity field in a sensor area, the wall shear stress on the sensor carrier, the isosurface of the vortex strength, and the wall flow lines are illustrated.
Figure 18B:
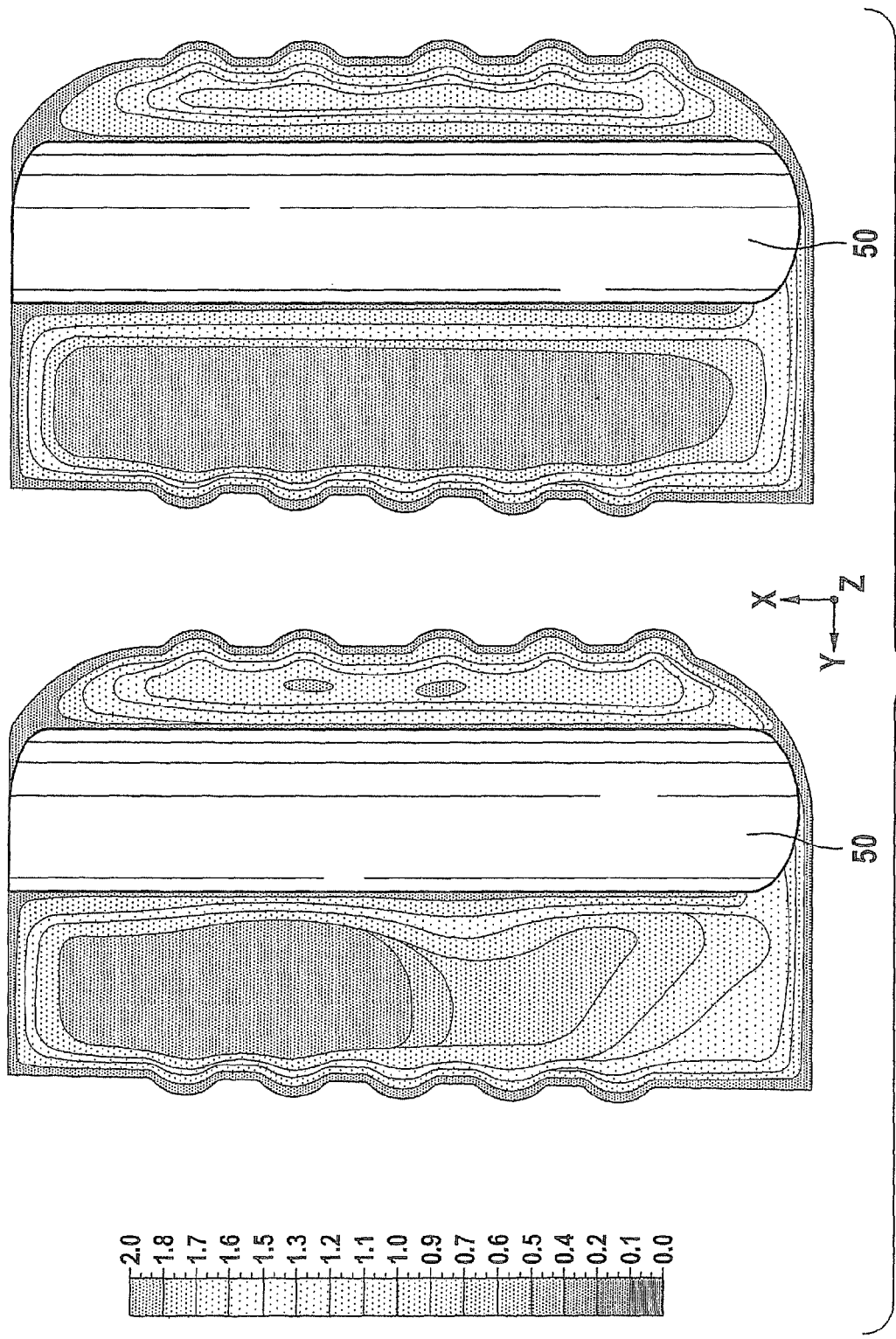
FIG. 18B shows enlarged illustrations of the velocity fields in FIG. 18A, viewed in the main flow direction.

FIG. 18A shows two results of a flow simulation using different air mass flows, none of the embodiments according to the present invention having been used. Thus, the geometric configuration shows the flow situation without secondary flows induced according to the present invention. In particular, the particular velocity field in a sensor area 32, the wall shear stress on sensor carrier 28, the isosurface of vortex strength 64, and wall flow lines 66 are shown for the simulation results. In particular, the left illustration in FIG. 18A shows a sensor carrier 28 over which an air mass flow of 90 kg/h flows, and the right illustration shows a sensor carrier 28 over which an air mass flow of 200 kg/h flows. Main flow direction 18 extends in the negative direction of the shown Z axis, and the surface of sensor carrier 28 is situated in a plane defined by the Y axis and the Z axis. Also shown is the particular velocity field in the immediate proximity of a sensor area, such as a sensor diaphragm 32, for example, in the plane perpendicular to main flow direction 18. The particular velocity fields are illustrated in enlarged scale in FIG. 18B. The differently dotted regions indicate the different velocities, a denser dot pattern corresponding to a higher velocity. The flows show clearly different velocity fields at the level of sensor diaphragm 32, clearly different wall shear stresses 62 on the sensor carrier, clear differences in the isosurfaces of vortex strength 64, and deviations in the variation of the wall flow lines 66 as the result of numerical flow simulations for the two cases of 90 kg/h and 200 kg/h. For example, in the example of a flow of 90 kg/h, wall shear stresses 62 in the positive direction of the X axis upstream from sensor area 32 are relatively straight and are apparent as light stripes, while wall shear stresses 62 in the example of a flow of 200 kg/h assume an approximately sinusoidal curve in the stated direction. The embodiments according to the present invention are intended to reduce the flow differences for different air mass flows. For example, the deviations with regard to the design of wall shear stresses 62 and the velocity profile shown in FIG. 18B should be reduced between the flow case having 90 kg/h and the case having 200 kg/h.

What is claimed is:

1. A sensor system for determining at least one parameter of an intake air mass flowing through a channel of an internal combustion engine, comprising:
at least one sensor chip situated in the channel for determining the parameter of the intake air mass, wherein the sensor chip is accommodated in a sensor carrier which protrudes into the channel, the sensor carrier having a leading edge situated transverse to the flow of the fluid medium; and
at least one vortex generator situated on the sensor carrier in the region of the leading edge, wherein the vortex generator is configured to form secondary flows in the form of vortices in the flowing intake air mass in the region of the sensor carrier, the vortex generator is configured to form secondary flows in the form of vortices in the flowing intake air mass in the region of the at least one sensor chip, and the secondary flows extend in a plane essentially perpendicular to the main flow direction of the intake air mass.

2. The sensor system as recited in claim 1, wherein the sensor carrier essentially defines a plane in the main flow direction of the intake air mass, and wherein the at least one vortex generator is configured in the form of at least one projection which protrudes from the plane of the sensor carrier.

3. The sensor system as recited in claim 2, wherein the at least one vortex generator is situated transverse to the main flow direction of the intake air mass.

4. The sensor system as recited in claim 2, wherein the at least one vortex generator extends from the leading edge to a rear edge of the sensor carrier when viewed in the main flow direction of the intake air mass.

5. The sensor system as recited in claim 2, wherein the at least one vortex generator is provided at least one of along the leading edge and along a rear edge of the sensor carrier when viewed in the main flow direction of the intake air mass.

6. The sensor system as recited in claim 5, wherein the at least one vortex generator is essentially semicircular.

7. The sensor system as recited in claim 1, wherein:
the sensor chip has at least one sensor area which projects into a plane perpendicular to the flow of the intake air mass; and
at least two vortex generators are situated in such a way that the at least one sensor area is located between the at least two vortex generators.

8. The sensor system as recited in claim 7, wherein the at least two vortex generators are configured to generate multiple vortices such that the secondary flows, at least in the region of the sensor area, are provided with vortex axes which are (i) parallel to the main flow direction of the intake air mass and (ii) in mutually opposite rotational direction.

9. The sensor system as recited in claim 1, wherein multiple vortex generators are situated parallel to one another and extend in the main flow direction of the intake air mass.

10. The sensor system as recited in claim 9, wherein at least one vortex generator is configured as an indentation at the front edge of the sensor carrier, the indentation extending in the main flow direction of the intake air mass.

11. A sensor system for determining at least one parameter of an intake air mass flowing through a channel of an internal combustion engine, comprising:
at least one sensor chip situated in the channel for determining the parameter of the intake air mass, wherein the sensor chip is accommodated in a sensor carrier which protrudes into the channel, the sensor carrier having a leading edge situated transverse to the flow of the fluid medium, and the at least one sensor chip has at least one sensor area which projects into a plane perpendicular to the flow of the intake air mass; and
at least one vortex generator situated on the sensor carrier in the region of the leading edge, wherein the at least one vortex generator is configured to form secondary flows in the form of vortices in the flowing intake air mass in the region of the sensor carrier, the secondary flows extend in a plane essentially perpendicular to the main flow direction of the intake air mass, at least two vortex generators are situated in such a way that the at least one sensor area is located between the at least two vortex generators, and the at least two vortex generators have different dimensions from each other.

12. A sensor system for determining at least one parameter of an intake air mass flowing through a channel of an internal combustion engine, comprising:
at least one sensor chip situated in the channel for determining the parameter of the intake air mass, wherein the sensor chip is accommodated in a sensor carrier which protrudes into the channel, the sensor carrier having a leading edge situated transverse to the flow of the fluid medium, and the at least one sensor chip has at least one sensor area which projects into a plane perpendicular to the flow of the intake air mass; and
at least one vortex generator situated on the sensor carrier in the region of the leading edge, wherein the at least one vortex generator is configured to form secondary flows in the form of vortices in the flowing intake air mass in the region of the sensor carrier, the secondary flows extend in a plane essentially perpendicular to the main flow direction of the intake air mass, at least two vortex generators are situated in such a way that the at least one sensor area is located between the at least two vortex generators,
the at least two vortex generators are configured to generate multiple vortices such that the secondary flows, at least in the region of the sensor area, are provided with vortex axes which are (i) parallel to the main flow direction of the intake air mass and (ii) in mutually opposite rotational direction, and the at least two vortex generators are configured to generate at least two vortices such that the respective secondary flows have different static pressures.

\* \* \* \* \*